W. J. STILL.
INTERNAL COMBUSTION ENGINE.
APPLICATION FILED OCT. 23, 1911.
1,145,391.
Patented July 6, 1915.
2 SHEETS—SHEET 1.
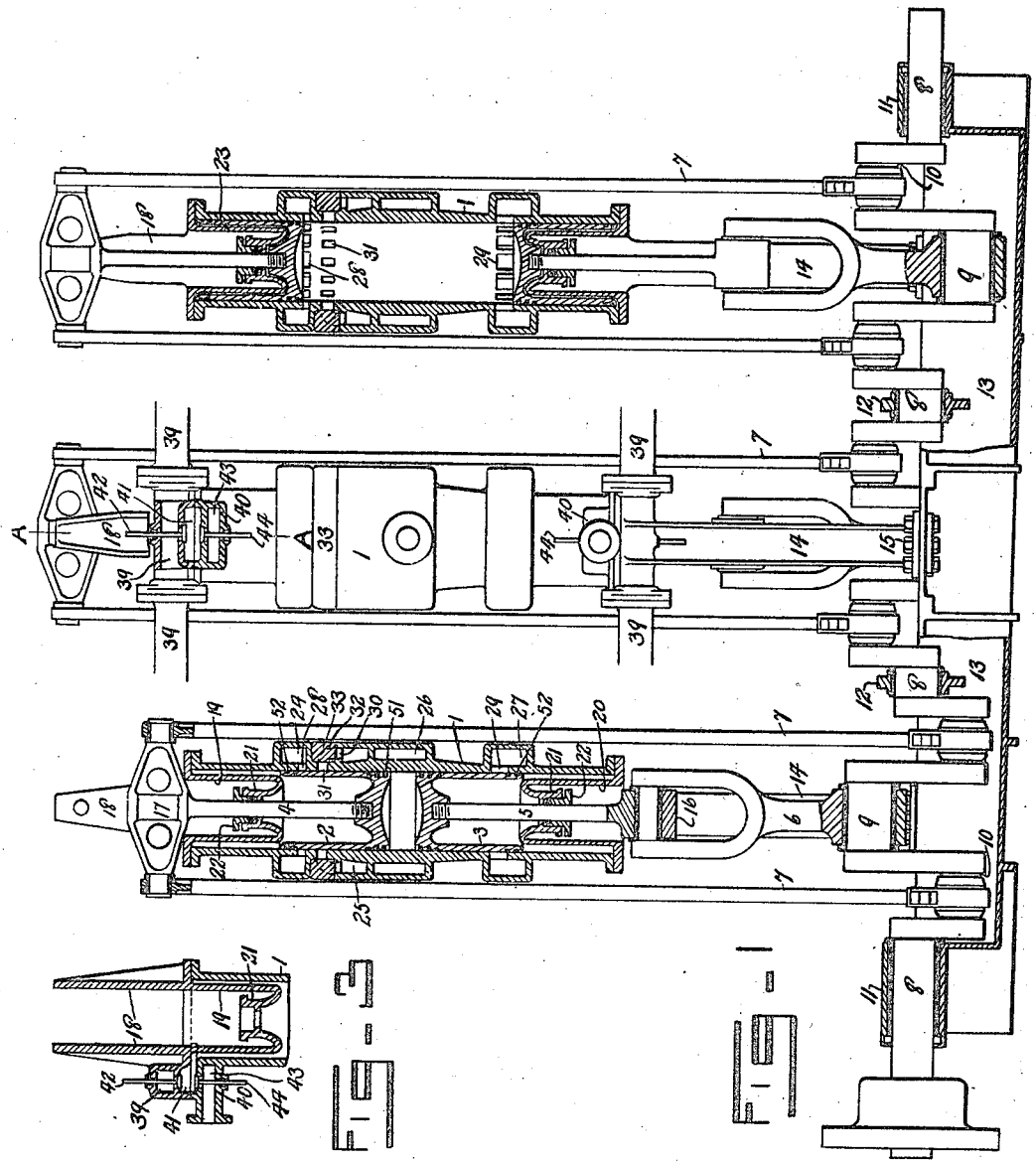

W. J. STILL.
INTERNAL COMBUSTION ENGINE.
APPLICATION FILED OCT. 23, 1911.
1,145,391.
Patented July 6, 1915.
2 SHEETS—SHEET 2.
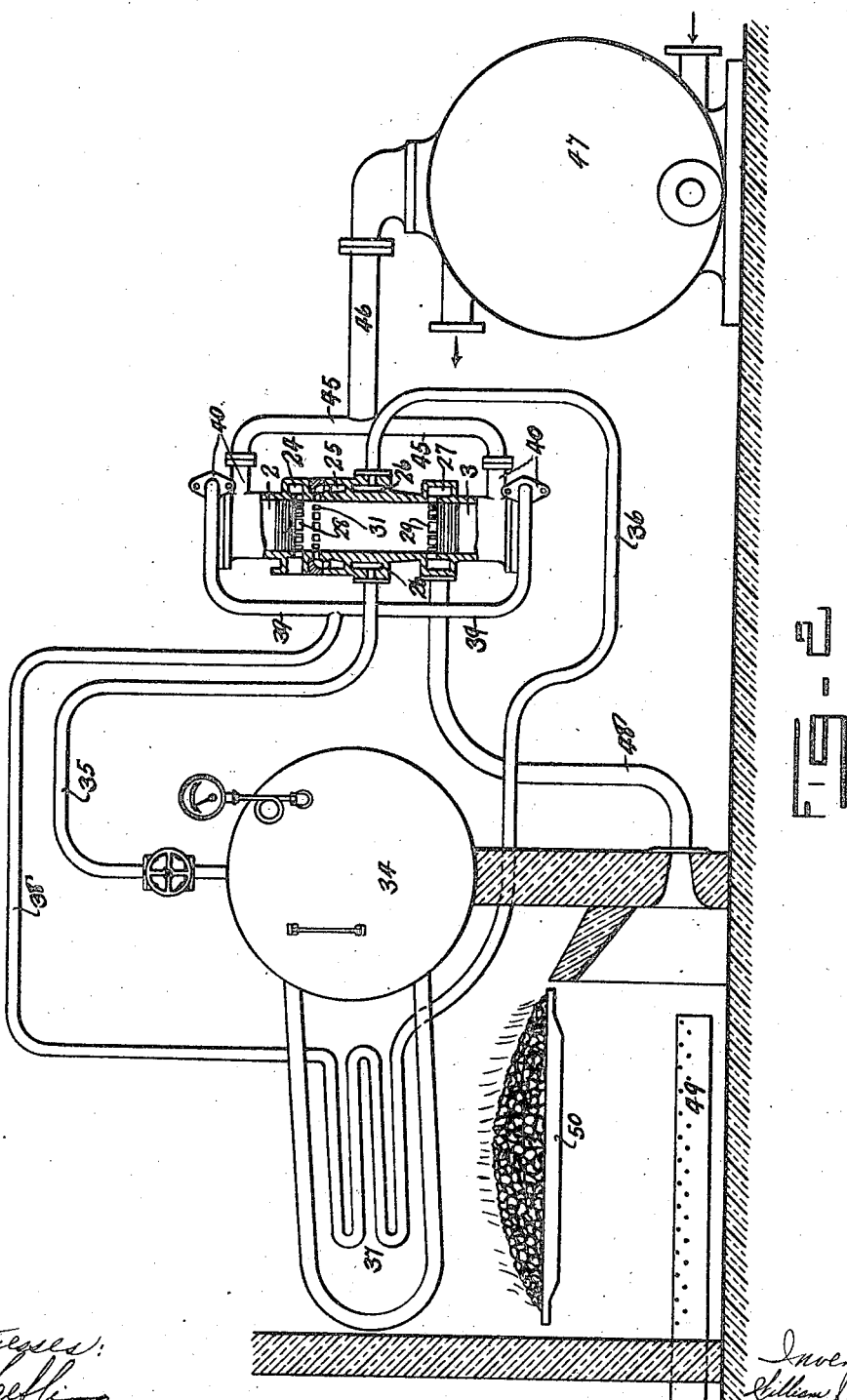

UNITED STATES PATENT OFFICE.

WILLIAM JOSEPH STILL, OF LONDON, ENGLAND.

INTERNAL-COMBUSTION ENGINE.

1,145,391.      Specification of Letters Patent.      Patented July 6, 1915.

Application filed October 23, 1911. Serial No. 656,191.

*To all whom it may concern:*

Be it known that I, WILLIAM JOSEPH STILL, of London, in the county of London, England, have invented certain new and useful Improvements in Internal-Combustion Engines, of which the following is a specification.

This invention relates to improvements in or connected with internal combustion engines, and has for its object to improve the thermal efficiency of internal combustion engines by utilizing, in a useful and practical manner for increasing the power of the engines, the heat transmitted by the piston and walls of the cylinders, and also the heat ordinarily discharged and wasted in the exhaust.

My invention consists in utilizing in a particular manner this ordinarily waste heat alone or together with extraneous sources of heat for generating steam or expanding some suitable elastic fluid and employing the steam or other elastic fluid thus produced for directly operating to move, or assist the movement of, the piston or pistons of an engine which primarily derives its power from the combustion or explosion of suitable charges. Numerous attempts have been made from time to time to utilize this ordinarily wasted heat, either alone or with supplemental firing for generating, and in some cases superheating, steam or expanding some other elastic fluid for use in the operation of the engine. These prior proposals have however failed to result in the desired practical efficiency probably on account of the fact that little attention has been paid to the temperature at which the exhaust gases have been delivered to the boiler or generator. In fact the majority of these prior propositions have involved water cooling of the cylinders even when it is proposed to use superheated steam.

An important feature of the present invention broadly consists in the provision of means for raising the general working temperature of the engine and consequently the temperature of the exhaust to the maximum permissible without impairing the efficiency of the engine as a combustion engine and preferably further increasing the exhaust temperature by a secondary combustion as will hereafter be made clear.

I have also found it is important not only to superheat the steam before it is utilized in the engine but also to maintain the superheat within the cylinders and my invention comprises within its scope means for insuring these conditions and also for recovering the heat from the steam exhaust which is of course under these conditions also of high temperature. To effect these objects I provide a construction of engine wherein the combustion cylinders and pistons are maintained at a temperature sufficiently high to superheat steam in a surrounding jacket, but at which lubrication shall be possible.

All internal combustion engines pass over with their exhaust a proportion of unburnt combustible and often large quantities of uncombined oxygen and a considerable addition can be made to the available heat of the exhaust gases by inducing the unburnt combustible to burn in a furnace associated preferably with a steam generator. To this end I propose to provide a chamber lined with some refractory material and provided with means for retaining the inferior surface at a red heat wherein this secondary combustion of the exhaust can take place. I may provide a grid of fire-brick or a coke bed may suffice although in some cases it may be necessary to employ a thin firebrick tube with a burner to maintain it at a red heat. Much will depend upon the temperature at which the exhaust is ejected from the engine, the essential condition— when this secondary combustion is employed—being that the exhaust gases on their way to the generator do not impinge upon cold surfaces. This secondary combustion chamber may also be utilized to effect the final superheating of steam for use in the engine; tubes being inserted into the path of the hot gases.

The usual circulating water jacket is entirely eliminated in my engine and if it is necessary to provide any means at all for abstracting excessive heat from the cylinder walls I provide a jacket in which water is evaporated or converted into steam or preferably wet steam is introduced into the jacket, the wet steam serving to effect the cooling and the heat abstracted from the cylinder walls serving to generate and superheat the steam prior to its use in the engine.

It is not broadly new to pass steam into contact with the heated surfaces and thus cool them but my invention differs in this respect from others in that the steam is superheated in the jacket before it is introduced into the cylinders. The temperature of the exhaust is thus raised owing to the retaining of a proportion at any rate of the heat usually lost to the cylinder walls. The temperature of combustion and that maintained during expansion is of course also increased owing to the general increase in working temperature, resulting in increased efficiency of the combustion engine as a heat engine. Further methods which I employ in my engine to reduce to a minimum the loss of heat to the cylinder walls are the reduction of the time of contact of the gases with the cylinder walls and piston, reduction of the contact surfaces or area and reduction of the temperature head, i. e. reduction of the difference between the temperature of the gases and the walls with which the gases come into contact. This third method really amounts to the raising of the cylinder wall temperature for it is obvious that reduction of the combustion temperature would mean loss of power. The raising of the cylinder wall temperature is consequent upon the fact that the cylinders are not water cooled, any cooling necessary to prevent lubrication troubles is as aforesaid effected by steam and the cylinder temperature is maintained sufficiently high to cause saturated steam to become superheated.

A rise in the temperature of combustion per se usually implies a decrease of efficiency—mixtures of combustibles which give the highest temperatures being of less efficiency than weaker mixtures—much of this decrease of efficiency is due to increased temperature head. It is however possible with a rise of wall temperature to obtain higher combustion temperatures without increasing the temperature head, i. e. without decrease of efficiency from that cause.

In order that the increased temperature shall not result in a reduction of the weight of the combustible charge owing to expansion I provide that the charge shall be subjected to a minimum of preheating. In other words the arrangement is such that the charge is introduced rapidly into the cylinders in a comparatively cold condition and the valve or port immediately closed, preheating taking place mainly in the closed cylinder before combustion.

The quantity of steam that it is possible to generate from the exhaust gases is strictly limited and it is therefore important that it should be used to the best advantage. It can be used in a special cylinder of suitable capacity but as additional friction would in this case have to be overcome and the cylinder temperature would be normally low, I prefer to introduce the steam into a closed space at the back of the combustion piston. In this way the friction of the piston, bearings, etc. of a separate steam cylinder is avoided and the only extra friction which has to be overcome is that of the piston rod glands and the valve gear and moreover the hot surfaces assist to maintain the superheat. Under ordinary conditions where the friction of the separate steam piston and its necessary fittings and connections has to be overcome the expansion could not be extended to the point desirable because it is probable that under such conditions excessive expansion would result in a loss instead of a gain, as the power derived would not be sufficient to overcome the engine losses.

The engine being primarily a combustion engine the cylinders are of greater displacement per weight or volume of steam generated than is usual in steam engine practice and the expansion of the steam generated by the exhaust gases is carried to a far more extended point for use in the combustion cylinders than is or could be profitable in an ordinary steam engine. In other words there is a comparatively small supply of steam which has to be employed in cylinders of much greater displacement than would be employed if the engine were purely a steam engine and the expansion is carried a good deal farther than would be desirable if the engine were purely a steam engine. It would indeed, almost certainly be found that, even in an engine constructed in accordance with my invention, if saturated steam were utilized in such quantities as the exhaust gases would generate the pressure in the cylinder would fall below that of the atmosphere before the end of the steam expansion stroke was reached. The end of the stroke would thus have a negative effect which would retard the engine. To avoid this I propose to not only superheat the steam before it is introduced into the cylinder but to maintain the superheat as far as possible toward the end of the expansion stroke as previously indicated.

In any case the construction of my engine is such, as will hereafter be made clear, that even if saturated steam were introduced into the cylinders, some superheating would at once take place by reason of the heat derived from the cylinder walls and the pistons, the pistons and cylinders being constructed and arranged to insure the translation of the steam to and fro over the piston surface as will hereafter be made clear. That is to say, the steam expansion is not merely adiabatic since after the steam has entered the cylinders heat from the pistons and cylinder walls derived from combustion will be imparted to it.

Having however overcome the latent heat of the steam it will be evident to those skilled in this branch of science that it will be profitable to expand it to its utmost volume by superheating before introducing it into the cylinder end and to maintain the superheat as long as possible. This will immediately be appreciated when comparison is made between the number of British thermal units required to overcome the latent heat of steam and the further number then required to effect the superheating. The same comparison will also make clear the importance of using high temperature combustion exhaust for the purpose of initially generating and superheating the steam.

If proper precautions were not taken lubrication troubles would undoubtedly arise at some temperatures which the pistons and cylinders would attain. Pre-ignition (with proper compression ratios) is not however likely to occur until after the temperature at which oil lubrication fails has been exceeded. In any case it is desirable to insure a high but regular temperature over the whole of the steam and combustion spaces of the cylinders and it is an important feature of my invention that I provide means for insuring a regular temperature throughout the length of the cylinders, such as will result in the highest possible maintained superheat and at the same time permit lubrication.

In order that my invention may be more readily understood, reference is hereby made to the accompanying drawings which illustrate an example of an engine constructed in accordance with and embodying the essential features of my invention.

Referring to these drawings Figure 1 shows by way of an example a three cylinder vertical engine constructed in accordance with my invention and designed for use with steam obtained from water as the elastic fluid employed. In this figure each set of cranks is shown inclined at 180° for convenience of illustration but they may be placed at 120° or any other suitable angle. Fig. 2 is a diagrammatic view showing the general arrangement of the plant, and Fig. 3 is a sectional view of the steam valve chest the section being taken on line A—A of Fig. 1.

In Fig. 1 the numeral 1 designates the cylinders, 2 and 3 the pistons which are concave at their ends in order to cause the combustion chamber to approximate as far as possible a spherical shape in order that there shall be a minimum conduction and radiation surface, 4 and 5 the piston rods, 6 and 7 the connecting rods, 8 the crank shaft and 9 and 10 the crank pins associated with the connecting rods 6 and 7 respectively. The crank shaft 8 is mounted in end bearings 11 and intermediate bearings 12 in the bed 13 and the cylinders are supported by columns 14 integral with the lower cylinder covers and bolted to the bed 13 by bolts 15. The columns 14 form guides for the cross heads 16 while the cross heads 17 work between guides 18 integral with the upper cylinder covers.

The pistons 2 and 3 are cup shaped in order that they may embrace the covers 19 and 20 and thus considerable surfaces are provided for contact with the steam; and in order to increase the contact surface so that the steam will tend to maintain a temperature closely approximating that of the metal surfaces, I may provide ribs or spirals on the piston trunk. The covers 19 and 20 are fitted with steam-tight stuffing boxes 21 which are fitted with glands 22. The outside diameters of the cups of the covers 19 and 20 are slightly less than the diameters of the bores of the pistons 2 and 3 in order that a thin annular chamber 23 (see right hand cylinder) is left, when the pistons are at the outer ends of their stroke, for the admission of steam. In this way the steam is caused to travel in contact with the heated surfaces of the pistons in a thin film and the rate of heat flow from the pistons to the steam is increased. Moreover at the beginning of the steam stroke the bulk of the steam is located at the end remote from piston head but as the stroke proceeds the cubic area at the back of the piston head increases more rapidly than that at the back of the piston trunk with a consequent translation of the rapidly cooling steam from one end of the piston to the other. It is thus brought into contact with the whole of the metal surfaces and kept in violent movement while in close contact with them and this is a most effective way of maintaining the superheat despite expansion. Around each cylinder are chambers 24, 25, 26 and 27. Ports 28 and 29 afford communication between the chambers 24 and 27 and the interior of the cylinders. Chamber 24 is supplied by a pump (not shown) with air under pressure which serves to scavenge the cylinders; chamber 27 receives the exhaust which is conducted therefrom, while jacket 25 conveys the new charge to the cylinder. Chamber 25 communicates by ports 30 and 31 through ports 32 in the ring valve 33 which may be made to coincide with ports 30 and 31 during the proper period of the cycle by any known form of timing gear operated preferably from the crank shaft 8.

The cycle of the internal combustion engine is as follows:—When the pistons 2 and 3 are at the outer ends of their strokes, (see right hand cylinder), ports 28 are uncovered and air admitted under pressure which drives out the burnt gases through the exhaust ports 29. As the pistons 2 and 3 approach one another the ports 28 are first covered, then ports 30, 31 and 32 made to coincide admitting the new charge which drives out the air remaining in the cylinder before the ports 29 are completely closed. When the new charge has been pumped in by any suitable form of pump, not shown, the ring valve shuts off communication with the interior of the cylinders, compression commences or is continued and the charge is fired and the cycle repeated.

The cooling of the cylinder when necessary is effected as aforesaid by passing steam generated by the water tube boiler 34 (Fig. 2) by steam pipe 35 to the chamber 26. Heat flows from the cylinder walls to the steam which is thereby initially superheated. The steam is conducted from chamber 26 by steam pipe 36 to the superheater 37 if necessary where its temperature is again increased. It is finally conducted by steam-pipe 38 to branch pipes 39 which conduct it to the valve chest 40 where it is admitted to chamber 41 which leads to the cylinder 1. The steam expands within the cylinder doing useful work upon pistons 2 and 3 while absorbing heat from the surfaces of the piston cylinder and cylinder cover or imparting heat to the latter if its temperature is less than that of the steam. The steam is exhausted into chamber 43, the exhaust being regulated by exhaust valve 44, and thence the steam passes by pipes 46 to a condenser 47 by any known form of pump or where the engine is not of the condensing type the exhaust steam may be utilized to preheat feed water.

The exhaust gases from the internal combustion engine are conducted by pipe 48 to the fire box of the water-tube boiler 34 where their combustion is completed or the oxygen mixed therein utilized to support the combustion of carbonaceous substances such as liquid hydrocarbon fuel fed through the perforated pipe 49 or coke supported upon the fire bars 50. A further supply of air or oxygen may be admitted to the furnace to assist the combustion.

The pistons are fitted with rings 51 of the ordinary gas engine type and further rings 52 are provided near the steam end of the piston for the purpose partly of preventing leakage of steam around the piston but mainly for preventing exhaust from the combustion chamber being drawn into the cylinder by the vacuum pump from the chamber 27 and thus destroying the vacuum. That is to say, the tendency of the combustion gases is to leak toward the vacuum and an escape under considerable pressure past the first set of rings 51 may be expected. When however these escape gases reach either the ports 24—which are exposed to comparatively low pressure—or the ports 29, which may be regarded as at or slightly more than atmospheric pressure, the pressure of the escaping gases will become so low that the rings 52 will effectually prevent their escape to the cylinder ends.

It will be noticed that in the engine hereinbefore described the superheated steam is introduced into the cylinders at parts remote from the combustion chamber or heat zone and thus by reason of the heat flow there is a tendency to level up the temperature throughout the whole length of the cylinders. That is to say, the impinging of the superheated steam upon surfaces remote from the combustion center or zone will tend to keep these surfaces up to its temperature and the intensely hot combustion center will tend to give up its heat to the steam when cooled by expansion and to the surfaces of lower temperature. In further explanation it may be pointed out that the steam as it enters the cylinder encounters first the valve next the valve chamber, then it passes along the piston walls and finally it reaches the head of the piston, the velocity diminishing all the time as also does the volume passing each portion of the surface. That is to say, the whole volume passes the valves, part only passes the piston walls and less still finds its way into the space between the back of the piston and the cylinder cover. Thus if the steam be superheated to 600° F. the valves will approach this temperature, the valve chamber will be slightly cooler and thus by the time the steam reaches the cylinder cover extension inside the piston walls it would have been very considerably cooled, except that its contact with the piston results in its temperature being maintained, the piston being cooled as a consequence. The maximum combustion temperatures are therefore acting at parts of the piston remote from the steam superheat and the two effects tend to equalize the temperature throughout as also does the movement of the piston by translating the heat to and fro over the inner surfaces.

The engine also has the advantage that it is balanced. Although I have described my invention as applied to an engine of a particular type, it will of course be understood that I do not limit myself to this particular construction but may make such variations as fall within the scope of my claims. For instance a four cycle engine may be constructed involving the same thermal conditions and the steam may be employed in conjunction with some only of the cylinders, or in a separate steam cylinder. That is to say an engine may be constructed having some of its cylinders operating solely as combustion cylinders while other cylinders may be combined steam or expansion and combustion cylinders.

In internal combustion engines where fuel is injected after compression, such as those constructed on the Diesel principle, the objects of my invention can be realized and it will be found that fortifying the exhaust by added supplies of carbonaceous matter will be of value.

I wish it to be understood that the term steam is not necessarily limited to steam derived from water but is employed in its generic sense and is intended to include the vapors resulting from the heating of other liquids such for instance as alcohol. Moreover in some circumstances with a suitable design of engine, air particularly if accompanied by moisture, may be employed as the expansive fluid.

What I claim as my invention and desire by Letters Patent is:

1. In an internal combustion engine adapted to operate partially under steam, a cylinder, a long piston reciprocating in said cylinder, packing rings at both ends of said piston, a cylinder cover, a combustion chamber formed in said cylinder upon one side of said piston, a steam chamber formed in said cylinder between the piston and the cylinder cover, means for controlling the admission and exhaust of steam to and from the steam chamber, a condenser to which the steam is exhausted, means for permitting the admission and exhaust of the combustible charge to and from the combustion chamber and a low pressure port for the escape of gases which leak past the packing rings at the combustible end of the piston and tend to reach the steam chamber substantially as specified.

2. In an internal combustion engine adapted to operate partially under steam, a cylinder, a cylinder cover, a long piston reciprocating in said cylinder, packing rings at both ends of the piston, a combustion chamber in the cylinder on one side of the piston, a steam chamber in the cylinder at the other side of said piston, means for controlling the admission and exhaust of steam to and from the steam chamber, a condenser to which the steam is exhausted, an inlet port for the admission of combustible charge to the combustion chamber, and a low pressure exhaust port for the escape of the exhaust gases so located that gases leaking past the packing rings at the combustion end of the piston and tending to reach the steam chamber become trapped between the two sets of packing rings and escape by said low pressure exhaust port substantially as specified.

3. In an internal combustion engine adapted to operate partially under steam, a cylinder, cylinder covers, long opposing pistons reciprocating in said cylinder, packing ings at both ends of each piston, a combustion chamber formed in said cylinder between said opposing pistons, steam chambers formed between the pistons and the cylinder covers, means for permitting the admission and exhaust of steam to and from the steam chambers, a condenser to which the steam is exhausted, an inlet port for the admission of the combustible charge to the combustion chamber, an exhaust port for the escape of exhaust gases, a scavenge port, through which air enters to scavenge the cylinder, said exhaust port and said scavenge port being so arranged and located that they operate as low pressure ports through which gases leaking past the packing rings at the combustion ends of the pistons are prevented from reaching the steam chamber by the packing rings at the steam ends of the pistons substantially as specified.

4. In an internal combustion engine adapted to operate partially under steam, a jacketed cylinder having separated combustion and steam chambers and means for controlling the admission and exhaust of the charges to said chambers, a steam generator, means for conducting the exhaust gases from the combustion chamber to said generator, means for conveying steam from the generator to the cylinder jacket surrounding the combustion chamber and means for conveying the steam from the jacket to the steam chamber of the engine cylinder substantially as specified.

5. In an internal combustion engine adapted to operate partially under steam, a jacketed cylinder having separated combustion and steam chambers and means for controlling the admission and exhaust of the charges to said chambers, a steam generator, means for conducting the exhaust gases from the combustion chamber to said generator, means for conveying steam from the generator to the cylinder jacket surrounding the combustion chamber, a steam superheater, means for conveying the steam from the cylinder jacket to the superheater and means for conveying the superheated steam from the superheater to the steam chamber substantially as specified.

6. In an internal combustion engine adapted to operate partially under steam, a cylinder, a cylinder cover for said cylinder having an inner cylindrical wall and forming an annular chamber between itself and the cylinder wall proper, a piston slidably mounted in said cylinder and dividing the same into a combustion and a steam chamber, said annular chamber being on the steam side of the piston, said piston being hollow so that it may slide into the said annular space and being proportioned to transmit a relatively large amount of heat from one surface to the other, means for permitting the inlet and exhaust of the combustion charge to and from said combustion chamber, and means for permitting the inlet and exhaust of steam to and from the steam chamber at a position remote from the combustion center whereby the steam is translated to and fro in a thin film over the hot surface of the piston, substantially as specified.

7. In an internal combustion engine adapted to operate partially under steam, a cylinder, a cover for said cylinder having a convex inner surface and forming an annular chamber between itself and the cylinder wall proper, a piston slidably mounted in said cylinder and dividing the same into a combustion chamber and a steam chamber, said annular chamber being on the steam side of the piston, said piston being hollow and so arranged that it slides into and out of said annular chamber, said piston being proportioned also to transmit a relatively large amount of heat from one surface to the other, means for permitting the admission and exhaust of the combustible charge to and from the combustion chamber, and means permitting the inlet and exhaust of steam to and from the steam chamber at the end of the cylinder remote from the combustion chamber, whereby the steam passing to and fro along the passage between the walls of the cylinder cover and the cylinder to the back of the piston first increases the temperature of the cooler parts and cools the hotter parts and the superheat of the steam is maintained despite expansion, substantially as specified.

8. In an internal combustion engine adapted to operate partially under steam, a cylinder, opposed hollow pistons reciprocating in said cylinder and dividing the same into three chambers, there being a steam chamber at each end of the cylinder and a central combustion chamber intermediate the pistons, cylinder covers conforming to said pistons and defining an annular space intermediate themselves and the cylinder wall proper, said pistons being proportioned to transmit a relatively large amount of heat from one surface to the other and being arranged to slide into and out of said annular space, means for permitting the admission and exhaust of the combustible charge to and from said combustion chamber, and means for permitting the admission and exhaust of steam to and from said steam chambers along the passage between the cylinder covers and the cylinders to the backs of said pistons, substantially as specified.

In testimony whereof I affix my signature in presence of two witnesses.

WILLIAM JOSEPH STILL.

Witnesses:
ERIC LESLIE BRENIS,
VINCENT HUGHES.

Copies of this patent may be obtained for five cents each, by addressing the "Commissioner of Patents, Washington, D. C."